Patented July 22, 1924.

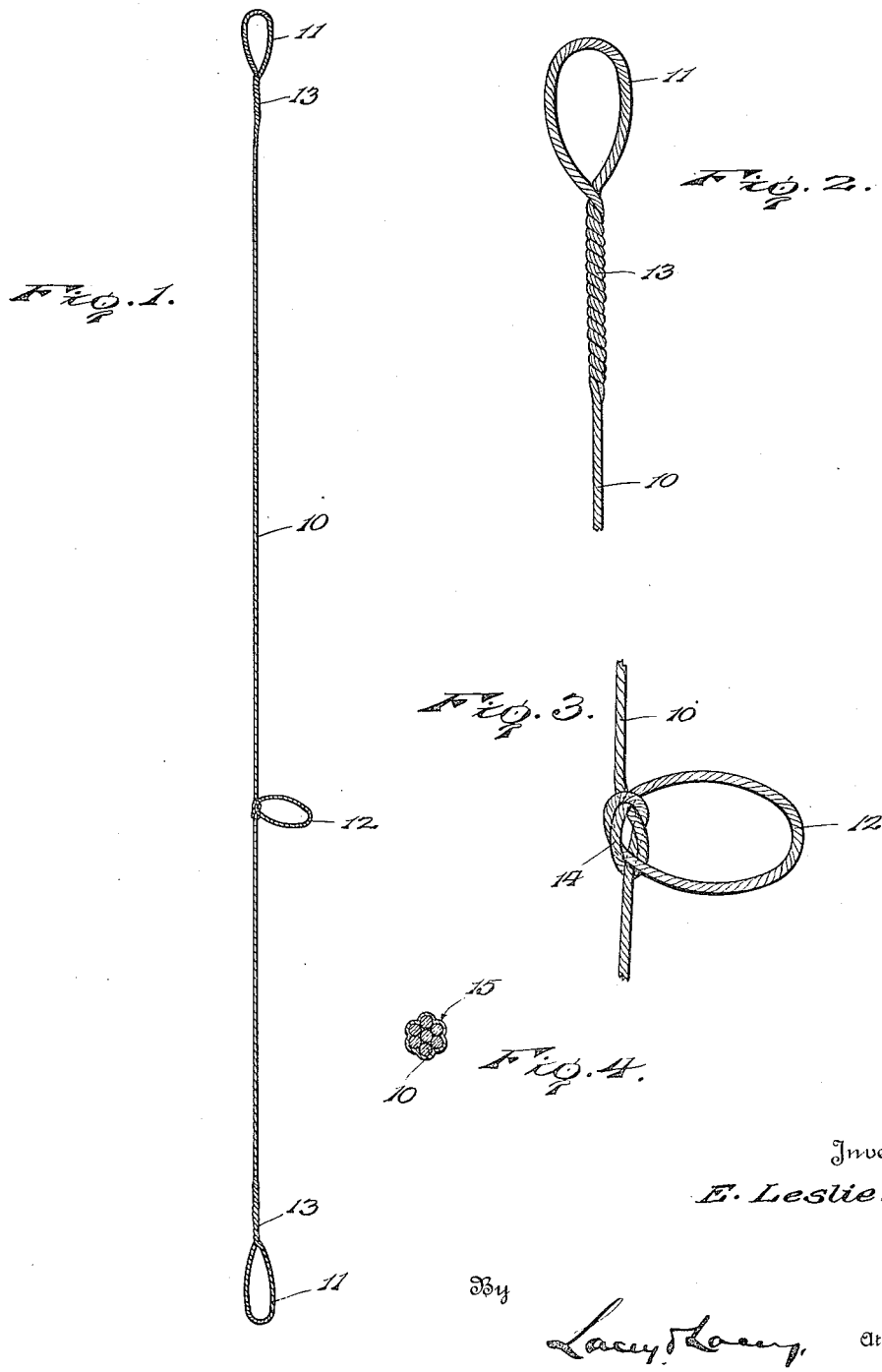

1,501,953

UNITED STATES PATENT OFFICE.

ELMER LESLIE, OF MEDFORD, OREGON.

FISHING LEADER.

Application filed December 13, 1922. Serial No. 606,675.

*To all whom it may concern:*

Be it known that I, ELMER LESLIE, a citizen of the United States, residing at Medford, in the county of Jackson and State of Oregon, have invented certain new and useful Improvements in Fishing Leaders, of which the following is a specification.

This invention relates to an improved leader for fishing lines and seeks, as one of its principal objects, to provide a leader which will not tangle and which, when in the water, will be more invisible than the ordinary gut leader.

The invention seeks as a further object, to provide a leader which, in proportion to its size, will be stronger than the ordinary gut leader.

And the invention has as a still further object to provide a leader which will be adapted to supplant the usual leaders as now in common use and which, in practice, will be found more efficient.

Other and incidental objects will appear hereinafter.

In the drawings:

Figure 1 is an elevation of my improved leader,

Figure 2 is an enlarged detail elevation showing the manner in which the loops at the ends of the leader are formed, Figure 3 is an enlarged detail elevation showing the manner in which the medial loop of the leader is formed, and Figure 4 is an enlarged cross sectional view through the leader.

Referring now more particularly to the drawings, I have shown a leader constructed in accordance with the present invention, at 10. As brought out in Figure 4, the leader is composed preferably of a plurality of fine steel wire strands twisted together. The leader will thus possess great tensile strength in proportion to its size and, in actual practice, has been found much stronger than the ordinary gut leader. Furthermore, by employing a number of steel wire strands to make up the leader, the leader will, while being amply flexible, nevertheless, possess sufficient stiffness to prevent tangling of the leader when casting or otherwise manipulating a line carrying the leader. In the present instance, I have shown the leader constructed to accommodate a pair of hooks and the leader is accordingly provided at its ends with loops 11 as well as an intermediate loop 12 located near one end of the leader so that when a line is attached to the loop 12, the hooks carried by the loops 11 will be disposed one above the other. As shown in Figure 2, the leader ends are secured at the loops 11 by tightly twisting said ends about the leader, as indicated at 13, while at the loop 12 slipping of the leader is prevented by tying a knot in the leader, as indicated at 14. After the loops 11 and 12 have been formed upon the leader, the leader is then covered with a coating 15 of silver solder. As will be appreciated, this coating will tend to prevent unwrapping of the twisted ends 13 of the leader as well as loosening of the knot 14 while the steel strands of the leader will be efficiently protected against rust. Furthermore, the silver solder will, upon being wet, tend to turn dark, thus enhancing the invisibility of the leader when in the water. I accordingly provide a particularly efficient leader and it has been found in practical use, that a leader constructed in accordance with the present invention, will, in the casting of a line, cut through the water much more readily than an ordinary gut leader and will also cause less splashing.

Having thus described the invention, what is claimed as new is:

A fishing leader including a leader member of wire for connecting a hook with a fishing line, and a coating of silver solder covering the wire and tending to render the leader invisible when in the water.

In testimony whereof I affix my signature.

ELMER LESLIE. [L. S.]